United States Patent
Imran

(10) Patent No.: US 12,093,048 B2
(45) Date of Patent: Sep. 17, 2024

(54) CLUSTERING TRACK PAIRS FOR MULTI-SENSOR TRACK ASSOCIATION

(71) Applicant: Aptiv Technologies AG, Schaffhausen (CH)

(72) Inventor: Syed Asif Imran, Moorpark, CA (US)

(73) Assignee: Aptiv Technologies AG, Schaffhausen (CH)

( * ) Notice: Subject to any disclaimer, the term of this patent is extended or adjusted under 35 U.S.C. 154(b) by 325 days.

(21) Appl. No.: 17/524,667

(22) Filed: Nov. 11, 2021

(65) Prior Publication Data

US 2023/0147100 A1 May 11, 2023

(51) Int. Cl.
| | |
|---|---|
| *G05D 1/00* | (2024.01) |
| *B60W 40/04* | (2006.01) |
| *G06F 18/22* | (2023.01) |
| *G06F 18/23* | (2023.01) |

(Continued)

(52) U.S. Cl.
CPC .......... *G05D 1/0214* (2013.01); *B60W 40/04* (2013.01); *G06F 18/23* (2023.01); *G06F 18/25* (2023.01); *G06V 10/457* (2022.01); *B60W 2420/40* (2013.01); *B60W 2420/408* (2024.01); *G05D 1/0246* (2013.01); *G05D 1/0248* (2013.01); *G05D 1/0257* (2013.01); *G06F 18/22* (2023.01)

(58) Field of Classification Search
CPC .............. G05D 1/0214; G05D 1/0246; G05D 1/0248; G05D 1/0257; G06V 10/457; G06F 18/25; G06F 18/23; G06F 18/22; B60W 40/04; B60W 2420/40; B60W 2420/52

See application file for complete search history.

(56) References Cited

U.S. PATENT DOCUMENTS

| | | | |
|---|---|---|---|
| 2016/0042253 A1* | 2/2016 | Sawhney | G06F 18/2323 382/190 |
| 2017/0178310 A1* | 6/2017 | Gormish | G06T 7/30 |
| 2017/0206436 A1* | 7/2017 | Schiffmann | G01S 13/867 |

(Continued)

OTHER PUBLICATIONS

Jonker, et al., "A Shortest Augmenting Path Algorithm for Dense and Sparse Linear Assignment Problems", May 6, 1986, 16 pages.

(Continued)

*Primary Examiner* — Pinalben Patel
(74) *Attorney, Agent, or Firm* — Harness, Dickey & Pierce, P.L.C.

(57) ABSTRACT

This document describes systems and techniques for clustering track pairs for multi-sensor track association. Many track-association algorithms use pattern-matching processes that can be computationally complex. Clustering tracks derived from different sensors present on a vehicle may reduce the computational complexity by reducing the pattern-matching problem into groups of subproblems. The weakest connection between two sets of tracks is identified based on both the perspective from each track derived from a first sensor and the perspective of each track derived from a second sensor. By identifying and pruning the weakest connection between two sets of tracks, a large cluster of tracks may be split into smaller clusters. The smaller clusters may require fewer computations by limiting the quantity of candidate track pairs to be evaluated. Fewer computations result in processing the sensor information more efficiently that, in turn, may increase the safety and reliability of an automobile.

20 Claims, 9 Drawing Sheets

(51) Int. Cl.
    *G06F 18/25*     (2023.01)
    *G06V 10/44*     (2022.01)

(56) References Cited

U.S. PATENT DOCUMENTS

2019/0129432 A1*   5/2019   Russell .................. G06F 18/23
2019/0354860 A1*  11/2019   Karg ..................... G06F 18/231

OTHER PUBLICATIONS

Kuhn, "The Hungarian Method for the Assignment Problem", Naval Research Logistics Quarterly, vol. 2, Issue 1-2, Mar. 1955, 15 pages.
Miller, et al., "Optimizing Murty's ranked assignment method", Jul. 1997, 17 pages.
Murty, "An Algorithm for Ranking all the Assignments in Order of Increasing Cost", May 2, 1967, 6 pages.
"Extended European Search Report", EP Application No. 22197724.2, Mar. 7, 2023, 9 pages.
Bereson, et al., "Efficient Track-to-Track Assignment Using Cluster Analysis", 2006 9th International Conference on Information Fusion, Jul. 1, 2006, 8 pages.

* cited by examiner

Feasibility Matrix

|  | Vision Tracks | | | | | |
|---|---|---|---|---|---|---|
| Radar Tracks | 404 | 406 | 408 | 410 | 412 | 414 |
| 416 | 1 |  |  |  |  |  |
| 418 | 1 | 1 |  |  |  |  |
| 420 |  | 1 |  |  |  |  |
| 422 |  | 1 | 1 |  |  |  |
| 424 |  |  | 1 |  |  |  |
| 426 |  |  | 1 | 1 |  |  |
| 428 |  |  |  | 1 |  |  |
| 430 |  |  |  | 1 | 1 |  |
| 432 |  |  |  |  | 1 |  |
| 434 |  |  |  |  | 1 | 1 |

Cost Matrix

|  | 404 | 406 | 408 | 410 | 412 | 414 |
|---|---|---|---|---|---|---|
| 416 | 1.79 | | | | | |
| 418 | 2 | 4.06 | | | | |
| 420 | | 1.1 | | | | |
| 422 | | 12.3 | 2.1 | | | |
| 424 | | | 1.8 | | | |
| 426 | | | 5.7 | 1.4 | | |
| 428 | | | | 1.1 | | |
| 430 | | | | 8.1 | 3.7 | |
| 432 | | | | | 1.9 | |
| 434 | | | | | 6.4 | 0.8 |

Radar Tracks (rows) / Vision Tracks (columns)

Evidence Matrix

| | Vision Tracks | | | | | |
|---|---|---|---|---|---|---|
| | 404 | 406 | 408 | 410 | 412 | 414 |
| 416 | 0.55866 | | | | | |
| 418 | 0.5 | 0.24631 | | | | |
| 420 | | 0.90909 | | | | |
| 422 | | 0.0813 | 0.47619 | | | |
| 424 | | | 0.55556 | | | |
| 426 | | | 0.17544 | 0.71429 | | |
| 428 | | | | 0.90909 | | |
| 430 | | | | 0.12346 | 0.27027 | |
| 432 | | | | | 0.52632 | |
| 434 | | | | | 0.15625 | 1.25 |

Radar Tracks

| | | Connection Weight Matrix | | | | | |
| | | | Vision Tracks | | | | |
| | | 404 | 406 | 408 | 410 | 412 | 414 |
| Radar Tracks | 416 | 1.5277 | | | | | |
| | 418 | 1.14226 | 0.5292 | | | | |
| | 420 | | 1.7351 | | | | |
| | 422 | | 0.21157 | 1.24863 | | | |
| | 424 | | | 1.46021 | | | |
| | 426 | | | 0.34251 | 1.21172 | | |
| | 428 | | | | 1.52042 | | |
| | 430 | | | | 0.38423 | 0.97009 | |
| | 432 | | | | | 1.55237 | |
| | 434 | | | | | 0.2751 | 1.888889 |

CLUSTERING TRACK PAIRS FOR MULTI-SENSOR TRACK ASSOCIATION

BACKGROUND

Automotive vehicles are becoming more sophisticated with the addition of sensors used to track objects near the vehicle. These objects may include other vehicles, pedestrians, animals, and inanimate objects, such as trees and street signs. The sensors (e.g., optical cameras, radar, Light Detection and Ranging (LiDAR)) collect low-level data (e.g., low-level tracks) that can be used to infer position, velocity, trajectory, class, and other parameters of the objects. A cluttered environment may result in many tracks from the various sensors. As the tracks are generated, steps may be taken to pair and associate the tracks originating from the different sensors to a common object. With many different possible associations or pairings of tracks, correctly matching the different tracks to a common object can be computationally complex. The computational complexity increases exponentially as the quantity of low-level tracks increases. Improving the processing speed (e.g., reducing the computational complexity) required for track association may increase the safety and reliability of an automobile, in particular, for autonomous or semi-autonomous control.

SUMMARY

This document describes systems and techniques for clustering track pairs for multi-sensor track association. Many track-association algorithms use pattern-matching processes that can be computationally complex. Clustering tracks derived from different sensors present on a vehicle may reduce the computational complexity by reducing the pattern-matching problem into groups of subproblems. The weakest connection between two sets of tracks is identified based on both the perspective from each track derived from a first sensor and the perspective of each track derived from a second sensor. By identifying and pruning the weakest connections between two sets of tracks, a large cluster of tracks may be split into smaller clusters. The smaller clusters may require fewer computations by limiting the quantity of candidate track pairs to be evaluated. Fewer computations result in processing the sensor information more efficiently that, in turn, may increase the safety and reliability of an automobile.

Aspects described below include clustering track pairs for multi-sensor track association. In one example, a system includes at least one processor that can determine candidate track pairs, each candidate track pair representing a connection between a first track obtained by a first sensor and a second track obtained by a second sensor, the connection based on an association between the first track and the second track to represent a same object. The processor can prune, responsive to identifying a connection with a weakest strength associated with the candidate track pairs, a weakest candidate track pair, the weakest candidate track pair having the connection with the weakest strength. The processor can also cluster, responsive to pruning the weakest candidate track pair, the candidate track pairs into at least a first cluster of the candidate track pairs and a second cluster of the candidate track pairs. The processor can determine, based on track-association techniques (e.g., pattern-matching techniques), a set of object track pairs from the at least first cluster of the candidate track pairs and the second cluster of the candidate track pairs, a first track and a second track of each respective object track pair in the set of object track pairs representing the same object. The processor can then output the set of object track pairs to an automotive system of a vehicle to control operations of the vehicle.

In another example, a method includes determining candidate track pairs, each candidate track pair representing a connection between a first track obtained by a first sensor and a second track obtained by a second sensor, the connection based on an association between the first track and the second track to represent a same object. The method further includes responsive to identifying a connection with a weakest strength associated with the candidate track pairs, pruning a weakest candidate track pair, the weakest candidate track pair having the connection with the weakest strength. The method further includes, responsive to pruning the weakest candidate track pair, clustering the candidate track pairs into at least a first cluster of the candidate track pairs and a second cluster of the candidate track pairs. The method further includes determining, based on track-association techniques, a set of object track pairs from the at least first cluster of the candidate track pairs and the second cluster of the candidate track pairs, a first track and a second track of each respective object track pair in the set of object track pairs representing the same object. The method further includes outputting the set of object track pairs to an automotive system of a vehicle to control operations of the vehicle.

This document also describes non-transitory computer-readable storage media having instructions that, when executed, cause a processor to perform the above-summarized method and other methods set forth herein.

This Summary introduces simplified concepts related to clustering track pairs for multi-sensor track association, further described below in the Detailed Description and as illustrated in the accompanying Drawings. This Summary is not intended to identify essential features of the claimed subject matter, nor is it intended for use in determining the scope of the claimed subject matter. Although primarily described in the context of increasing the efficiency of fusion tracker matching algorithms, the techniques for clustering track pairs for multi-sensor track association can be applied to other applications where matching low-level tracks with a high rate of speed and confidence is desired.

BRIEF DESCRIPTION OF THE DRAWINGS

The details of one or more aspects of clustering track pairs for multi-sensor track association are described in this document with reference to the following figures:

FIGS. 3-1 and 3-2 illustrate example multi-target scenarios in which clustering track pairs for multi-sensor track association may be implemented in accordance with techniques of this disclosure;

FIG. 4-1 illustrates a detailed multi-target scenario in clustering track pairs for multi-sensor track association may be implemented in accordance with techniques of this disclosure;

FIG. 4-2 illustrates an example feasibility matrix used for clustering track pairs for multi-sensor track association in accordance with techniques of this disclosure;

FIG. 4-3 illustrates an example cost matrix used for clustering track pairs for multi-sensor track association in accordance with techniques of this disclosure;

FIG. 4-4 illustrates an example evidence matrix used for clustering track pairs for multi-sensor track association in accordance with techniques of this disclosure;

FIG. 4-5 illustrates an example connection weight matrix used for clustering track pairs for multi-sensor track association in accordance with techniques of this disclosure; and FIG. 5 illustrates an example method for clustering track pairs for multi-sensor track association.

DETAILED DESCRIPTION

Overview

One of the key challenges of track-level fusion is associating low-level tracks originating from multiple sensors, particularly in a cluttered environment. Some methods, such as joint probabilistic association filtering (JPDA) and multiple hypothesis tracking (MHT) address the problem of track association by generating a set of patterns or hypotheses between two different sets of low-level tracks (e.g., vision tracks derived from camera data, radar tracks). These methods perform track association relatively accurately, but they can require intense and complex computations. They also rely on various pattern-finding algorithms (e.g., Hungarian algorithm, Auction algorithm) to find the best set of matched patterns that minimize an association cost between two sets of tracks. This computational complexity grows exponentially as the quantity of tracks increase.

One approach to overcome the computational complexity problem is to cluster the tracks into different groups. Clustering in this context includes obtaining a collection of tracks from one sensor that is linked to tracks from a different sensor. This collection of tracks can be considered incompatible and obtained from a feasibility matrix utilizing a connected component finding algorithm. This approach generally reduces the complexity to a certain extent by partitioning the assignment problem into smaller subproblems. Generally, the size of the cluster depends on how many tracks are linked together, and there is no fixed size of a cluster. However, in real-life applications, having a maximum allowable size limit for clusters may be required to keep the computational complexity within a certain level. In certain scenarios, the quantity of linked tracks in a cluster can be larger than a maximum allowable limit. In these cases, an alternative approach may be required to handle the larger cluster size.

This document describes systems and techniques for clustering track pairs for multi-sensor track association, especially in cases where a maximum allowable limit of linked tracks in a cluster is not practical. The approach, as described herein, includes splitting a large cluster into smaller clusters by identifying and removing some connections (e.g., track associations) between two sets of tracks in the large cluster and keeping any loss of matching/association related information to a minimum. Once the weaker connections are pruned, the stronger connections are retained, and the best patterns can still be generated without significant loss of association information.

The best patterns can be used to determine whether a track from one sensor relates to the same object as a track from another sensor. By using the systems and techniques described in this document, a sensor-fusion system may become more efficient at processing multi-sensor data, resulting in more accurate and reliable object-tracking data.

Example Environment

Figure 1:
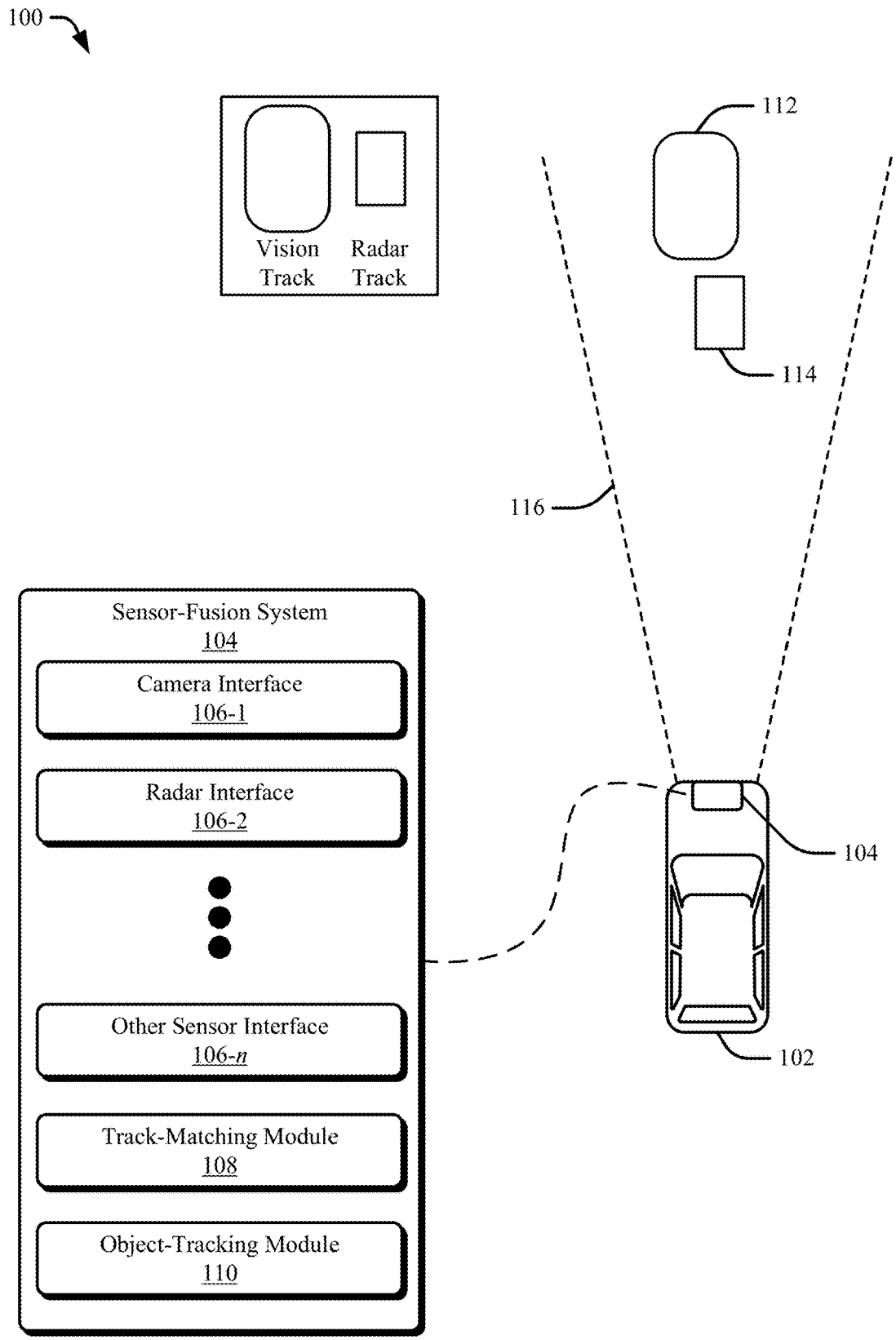
FIG. 1 illustrates an example operating environment of a vehicle that is configured to cluster track pairs for multi-sensor track association in accordance with techniques of this disclosure.

FIG. 1 illustrates an example operating environment 100 of a vehicle 102 that is configured to cluster track pairs for multi-sensor track association in accordance with techniques of this disclosure. In the depicted environment 100, a sensor-fusion system 104 is mounted to, or integrated within, the vehicle 102. Although illustrated as a car, the vehicle 102 can represent other types of vehicles and machinery (e.g., a motorcycle, a bus, a tractor, a semi-trailer truck, watercraft, aircraft, or other heavy equipment) including manned and unmanned systems that may be used for a variety of purposes.

The sensor-fusion system 104 may include one or more sensor interfaces 106-1 through 106-n (collectively "sensor interfaces 106"), a track-association module 108, and an object-tracking module 110. The sensor interfaces 106-1 through 106-n may include a camera interface 106-1, a radar interface 106-2, and one or more other sensor interfaces 106-n. Each of the sensor interfaces 106 provides the sensor-fusion system 104 with sensor data of a particular type. For example, the camera interface 106-1 produces vision data (e.g., vision track 112) generated by one or more camera sensors, and the radar interface 106-2 generates radar data (e.g., radar track 114) produced by a set of radar sensors in communication with the radar interface 106-2. The vision track 112 and the radar track 114 correspond to objects within a respective field-of-view (FOV) 116 of the sensors equipped on the vehicle 102.

The sensor-fusion system 104 can track objects in the FOV 116 based on the sensor data obtained from multiple sensors of the vehicle 102. Matching objects between multiple different sensors enables the sensor-fusion system 104 to reliably and accurately track objects that may need to be avoided while the vehicle 102 navigates the environment 100. For example, matching the vision track 112 and the radar track 114 to the same object enables the sensor-fusion system 104 to accurately track that object using the data from two different types of sensors. By leveraging the data from the two different types of sensors, any shortcomings of a particular type of sensor (e.g., cameras are less effective in foggy conditions) may be overcome, providing greater accuracy than data derived from a single type of sensor.

In general, manufacturers can mount the sensors and the sensor-fusion system 104 to any moving platform that can travel in the environment 100. The sensors can project their respective FOVs from any exterior surface of the vehicle 102. For example, vehicle manufacturers can integrate at least a part of the sensor-fusion system 104 (e.g., the sensors) into a side mirror, bumper, roof, or any other interior or exterior location where the FOV 116 includes a portion of the environment 100 and objects moving or stationary that are in the environment 100. Manufacturers can design the location of the sensors to provide a particular FOV that sufficiently encompasses portions of the environment 100 in which the vehicle 102 may be traveling. In the depicted implementation, a portion of the sensor-fusion system 104 is mounted near the front bumper section of the vehicle 102.

The track-matching module 108 receives low-level track data (e.g., the vision track 112, the radar track 114) from the sensor interfaces 106 and determines whether any candidate track pairs associate with the same object. That is, in a cluttered environment there may be multiple vision tracks 112 and multiple radar tracks 114. The track-matching module 108 evaluates each possible pair of vision track 112 and radar track 114 (e.g., candidate track pair) and determines a probability that a candidate track pair represents an object-track pair (i.e., a track pair that associates with the same object). The object-tracking module 110 maintains the object-track pairs and provides the object-track pair data to other automotive systems of the vehicle 102 to enable the vehicle to safely navigate the environment 100.

Example System

Figure 2:
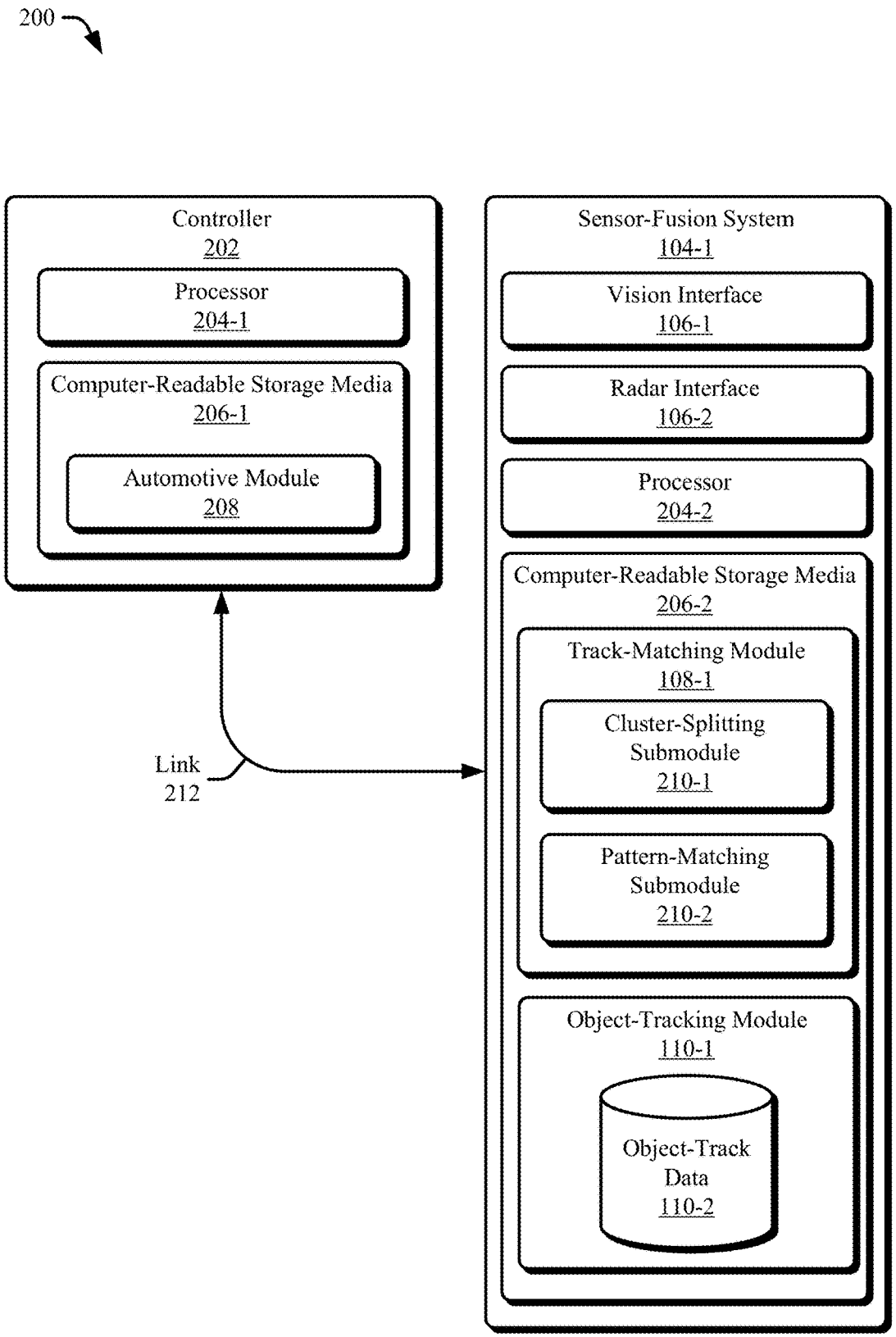
FIG. 2 illustrates an example of an automotive system configured to cluster track pairs for multi-sensor track association in accordance with techniques of this disclosure.

FIG. 2 illustrates an example of an automotive system 200 configured to cluster track pairs for multi-sensor track association in accordance with techniques of this disclosure. The automotive system 200 can be integrated within the vehicle 102. For example, the automotive system 200 includes a controller 202 and a sensor-fusion system 104-1. The sensor-fusion system 104-1 is an example of the sensor-fusion system 104 and can be integrated into an automotive or other vehicular environment. The sensor-fusion system 104-1 and the controller 202 communicate over a link 212. The link 212 may be a wired or wireless link and in some cases includes a communication bus. The controller 202 performs operations based on information received over the link 212, such as data output from the sensor-fusion system 104 as objects in the FOV 116 are identified from processing and merging object tracks.

The controller 202 includes a processor 204-1 and a computer-readable storage medium (CRM) 206-1 (e.g., a memory, long-term storage, short-term storage), which stores instructions for an automotive module 208. The sensor-fusion system 104-1 includes a radar interface 106-2 in addition to the camera interface 106-1. Any number of other sensor interfaces including the sensor interfaces 106 may likewise be used. The sensor-fusion system 104-1 may include processing hardware that includes a processor 204-2 and a computer-readable storage medium (CRM) 206-2, which stores instructions associated with a track-matching module 108-1 and an object-tracking module 110-1. The track-matching module 108-1, which is an example of the track-matching module 108, includes a cluster-splitting submodule 210-1 and a pattern-matching submodule 210-2. The object-tracking module 110-1, which is an example of the object-tracking module 110, includes object-track data 110-2. The object-track data 110-2 includes data of each object-track pair determined by the track-matching module 108-1.

The track-matching module 108-1 may determine object-track pairs through the execution of the cluster-splitting submodule 210-1 and the pattern-matching submodule 210-2. The cluster-splitting submodule may analyze and split a cluster of candidate track pairs into smaller clusters, reducing the computational complexity of determining the object-track pairs. The cluster of candidate track pairs may be split based on both the perspective of a track of a first sensor (e.g., camera sensor) compared to the tracks of a second sensor (e.g., radar sensor) and the perspective of a track of the second sensor compared to the tracks of the first sensor. The candidate track pair with the weakest connection based on the comparisons of the tracks can be pruned resulting in a split of a cluster into smaller clusters. The smaller clusters result in less possible candidate track pairs that need further processing by the pattern-matching submodule 210-2 to determine their likelihood of being object-track pairs. The pattern-matching submodule may use one or more processes, such as IPDA, MHT, or other processes to determine the object-track pairs. The object-tracking module 110-1 maintains the object-track pairs as object-track data 110-2 and may communicate the object-track data 110-2 to the automotive module 208 to operate the vehicle 102 in a safe manner as the vehicle 102 navigates the environment 100.

The processors 204-1 and 204-2 can be two separate or a single microprocessor or a pair of or a single system-on-chip of a computing device, a controller, or a control unit. The processors 204-1 and 204-2 execute computer-executable instructions stored within the CRMs 206-1 and 206-2. As an example, the processor 204-1 can execute the automotive module 208 to perform a driving function or other operation of the automotive system 200. Similarly, the processor 204-2 can execute the track-matching module 108-1 to infer objects in the FOV 116 based on sensor data obtained from multiple different sensor interfaces 106 of the vehicle 102. The automotive module 208, when executing at the processor 204-1, can receive an indication of one or more objects tracked by the object-tracking module 110-1 in response to the object-tracking module 110-1 receiving object-track pair data from the track-matching module 108-1. The track-matching module 108-1 determines the object-track pair data by combining and analyzing sensor data generated at each of the sensor interfaces 106 (e.g., the camera interface 106-1 and the radar interface 106-2) as previously described.

Generally, the automotive system 200 executes the automotive module 208 to perform a function. For example, the automotive module 208 can provide automatic cruise control and monitor for the presence of objects in the environment 100. In such an example, the object-tracking module 110-1 provides the object-track data 110-2 to the automotive module 208. The automotive module 208 may provide alerts when the data obtained from the object-tracking module 110-1 indicates one or more objects are crossing in front of the vehicle 102.

For ease of simplicity, implementations of the cluster-splitting submodule 210-1 of the track-matching module 108-1 are described below with reference primarily to the camera interface 106-1 and the radar interface 106-2, without reference to the other sensor interfaces 106. It should be understood, however, that the track-matching module 108-1 can combine sensor data from more than just two different categories of sensors (e.g., light detection and ranging (LiDAR) sensors) and can rely on sensor data output from other types of sensors besides just cameras and radar.

Example Implementations

Figure 3:
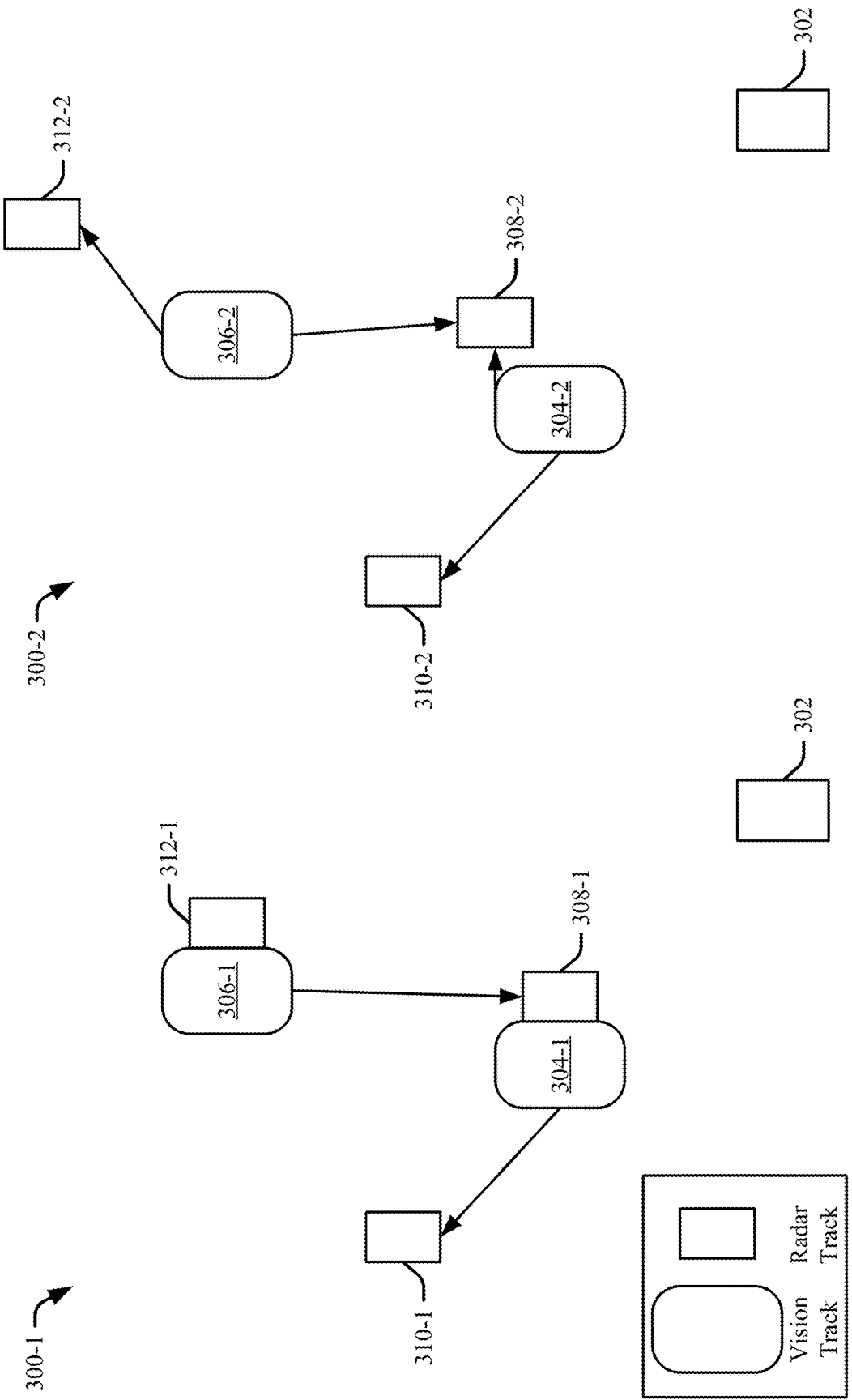

FIGS. 3-1 and 3-2 illustrate example multi-target scenarios 300-1 and 300-2 in which clustering track pairs for multi-sensor track association may be implemented, in accordance with techniques of this disclosure. The scenario 300-1 is illustrated in FIG. 3-1 and includes a host system 302 (e.g., the vehicle 102) that can track pairs for multi-sensor track association. A cluster-splitting submodule, similar to the cluster-splitting submodule 210-1, has received vision tracks 304-1 and 306-1 and radar tracks 308-1, 310-1, and 312-1. The vision track 304-1 has a strong connection with the radar track 308-1 and a weaker connection with the radar track 310-1. The weaker connection with the radar track 310-1 does not preclude the vision track 304-1 from being matched with the radar track 310-1 as the radar track 310-1 does not have a connection with another vision track. The vision track 306-1 has a strong connection with the radar track 312-1 and a weaker connection with the radar track 308-1. Since the radar track 308-1 has a strong connection (in terms of association cost/evidence) with the vision track 304-1, the weaker connection between the vision track 306-1 and the radar track 308-1 is more likely to be pruned. In this case, the larger cluster including all of the tracks (the vision tracks 304-1 and 306-1, and the radar tracks 308-1, 310-1, and 312-1) may be split into a first smaller cluster that includes the vision track 304-1 and the radar tracks 308-1 and 310-1 and a second smaller cluster that includes the vision track 306-1 and the radar track 312-1. Each smaller cluster may be evaluated by a pattern-matching submodule (e.g., the pattern-matching submodule 210-2) and results in the pattern-matching submodule making fewer calculations (e.g., less computational complexity).

Figures 1, 4:
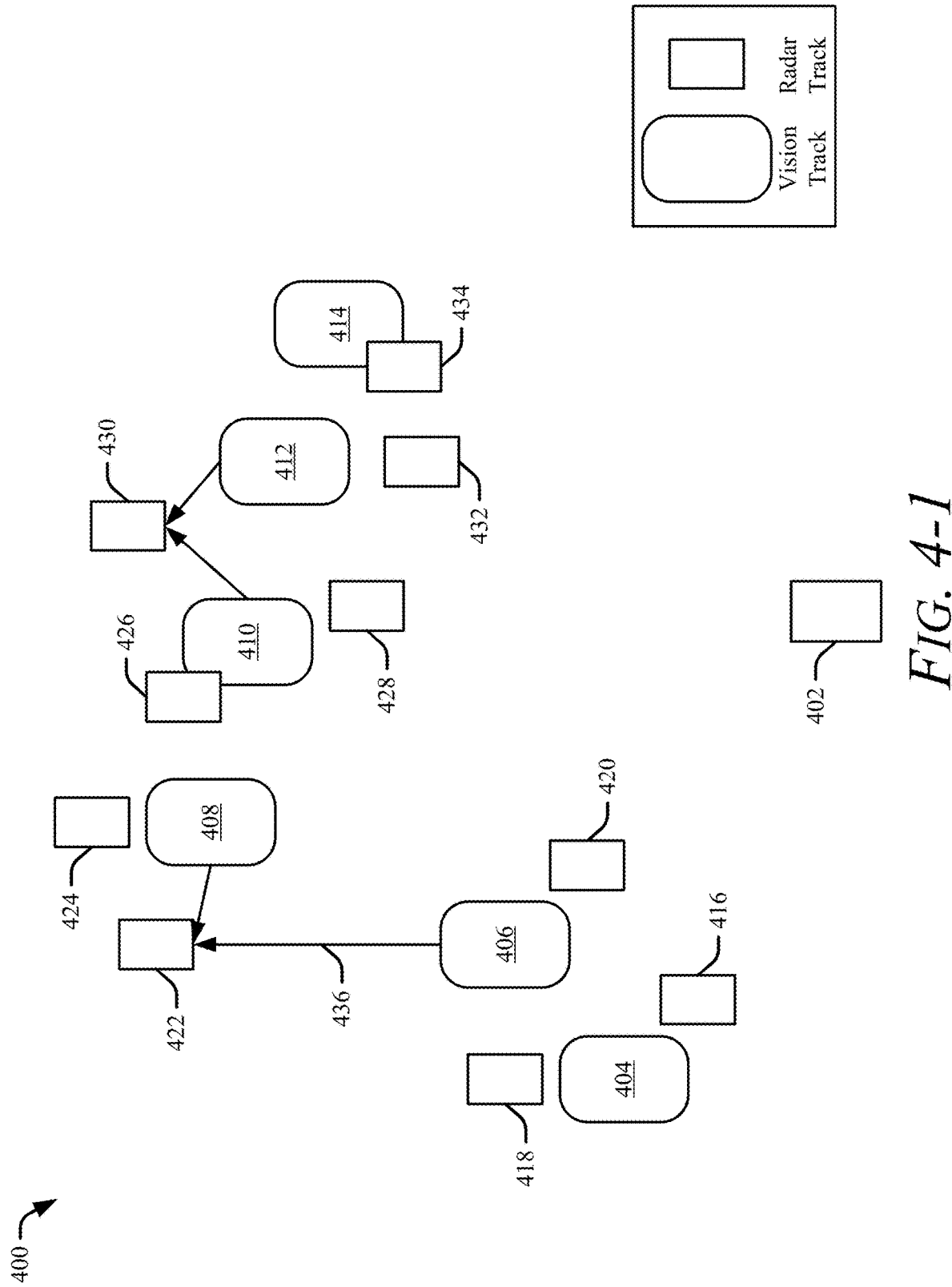
Figures 4, 5:
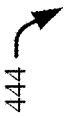
Figure 5:
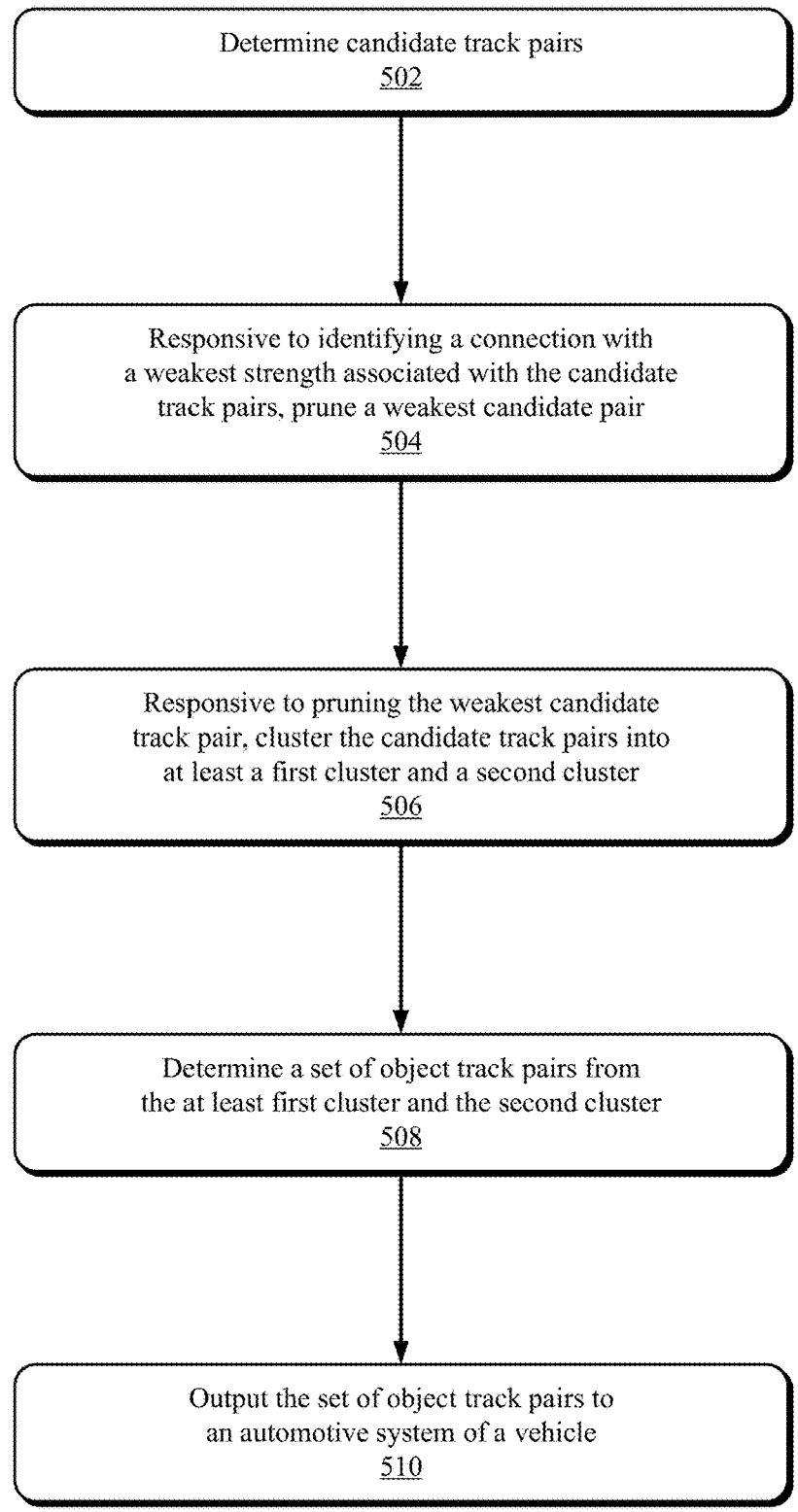

FIG. 3-2 illustrates the scenario 300-2 that is similar to the scenario 300-1. In the scenario 300-2, the cluster-splitting submodule for the host system 302 has received vision tracks 304-2 and 306-2 and radar tracks 308-2, 310-2, and 312-2. The vision track 304-2 has a strong connection (in terms of association cost) with the radar track 308-2 and a weaker connection with the radar track 310-2. The vision track 306-2 has connections with both the radar tracks 308-2 and 312-2, but in contrast to the vision track 306-1 in the scenario 300-1, these two connections with the vision track 306-2 have a similar association cost and evidence. In this case, neither connection is more likely to be pruned and both candidate track pairs (vision track 306-2 and radar track 308-2, vision track 306-2 and radar track 312-2) will be evaluated for the possibility of being an object-track pair. The larger cluster will not be split into smaller clusters, and all of the candidate track pairs will be evaluated by the pattern-matching submodule. The scenarios 300-1 and 300-2 illustrate that the probability of a given vision-radar candidate track pair that will be further pattern-matched depends not only on how likely a radar track is to be a good match for a vision track relative to other radar tracks, but also how likely a vision track is a good match for a radar track relative to other vision tracks. FIGS. 4-1 to 4-5 provide a more detailed scenario and description of some implementations of the cluster-splitting submodule.

FIG. 4-1 illustrates a detailed multi-target scenario 400 in which clustering track pairs for multi-sensor track association may be implemented, in accordance with techniques of this disclosure. A host system 402 (e.g., the vehicle 102) is configured for clustering track pairs for multi-sensor track association and includes a cluster-splitting submodule, similar to the cluster-splitting submodule 210-1. The cluster-splitting submodule has received a large cluster of tracks including vision tracks 404, 406, 408, 410, 412, and 414, and radar tracks 416, 418, 420, 422, 424, 426, 428, 430, 432, and 434. The candidate track pairs are formed by matching each vision track to each radar track. The cluster-splitting submodule can evaluate the tracks to determine if the two tracks included in a candidate track pair have a weak connection. In some aspects, the weak connection may be under a threshold to be considered for pruning. If a weak connection 436 is determined, then the weak connection 436 may be pruned, and the large cluster of tracks may be split into smaller clusters. In some aspects, the size of the large cluster may be larger than a predetermined size. That is, the quantity of candidate track pairs may be greater than a threshold quantity. Weak connections, such as the weak connection 436, may be determined by the techniques described in relation to FIGS. 4-2 to 4-5 and refer back to the scenario 400.

FIG. 4-2 illustrates an example feasibility matrix 438 used for clustering track pairs for multi-sensor track association, in accordance with techniques of this disclosure. Once the cluster-splitting submodule receives a cluster of tracks, the feasibility of each candidate track pair is determined. In the scenario 400, the cluster-splitting submodule generates and maintains a feasibility matrix to determine a possible connection between each track received by a first sensor (e.g., camera sensor) and each track received by a second sensor (e.g., radar sensor). This determination is based on gating criteria and may depend on data derived from the tracks such as general proximity of tracks derived from the camera sensor and tracks derived from the radar sensor. Other data derived from the tracks may also be used.

Candidate track pairs are determined to be feasible or not feasible at this first step. For example, a candidate track pair that includes the vision track 404 and the radar track 416 is feasible, and a true value (e.g., a value of "1") is given to this candidate track pair in the feasibility matrix 438. Candidate track pairs that are not feasible are given a false value (e.g., a blank value or a value of "0"). Tracks from one sensor may be feasible with multiple tracks from another. As illustrated in the feasibility matrix 438, the candidate track pair that includes the vision track 404 and the radar track 418 is also feasible. In the scenario 400, according to the feasibility matrix, there are fifteen feasible candidate track pairs.

FIG. 4-3 illustrates an example cost matrix 440 used for clustering track pairs for multi-sensor track association, in accordance with techniques of this disclosure. Once the feasibility for each candidate track pair is determined, a cost for each feasible candidate track pair is determined. Similar to the determination of feasibility, the cost value may depend on data derived from the tracks. For example, a candidate track pair may include a vision track classified as a pedestrian and the corresponding radar track may include a velocity that is unrealistic for a pedestrian. In this case, the candidate track pair has a lower likelihood of being a match, and, thus, a higher cost is assigned to the candidate track pair. The cost matrix reflects a higher cost for the candidate track pair that includes the vision track 406 and the radar track 422. In contrast, the candidate pair that includes the vision track 406 and the radar track 420 has a much lower cost.

FIG. 4-4 illustrates an example evidence matrix 442 used for clustering track pairs for multi-sensor track association, in accordance with techniques of this disclosure. The evidence matrix is obtained by taking the inverse of the cost of the feasible candidate track pairs in the cost matrix 440. For example, the cost associated with the candidate track pair that includes the vision track 404 and the radar track 418 has a value of "2". The inverse of that cost is "0.5" as illustrated in the evidence matrix 442.

FIG. 4-5 illustrates an example connection weight matrix 444 used for clustering track pairs for multi-sensor track association, in accordance with techniques of this disclosure. The connection weight matrix 444 evaluates the connection strength of each feasible candidate track pair by normalizing the evidence of each feasible track pair and calculating a connection weight for each feasible track pair. For each vision track, the evidence of the candidate radar tracks is normalized according to:

$$Vis\,\text{Wt}(i, j) = \frac{\text{Evidence}(i, j)}{\sum_{j=1}^{N_{rdr}} (FM(i, j) * \text{Evidence}(i, j))} \quad \text{Equation 1}$$

where,
  VisWt(i,j)=vision track weight at entry (i,j) of the evidence matrix,
  Evidence(i,j)=the evidence value at entry (i,j) of the evidence matrix, and
  FM(i,j)=Entry in feasibility matrix (1 for feasible pair and 0 for non-feasible pair).

An example of this calculation can be shown by evaluating the VisWt(i,j) for the vision track 404. The denominator of equation 1 for the vision track 404 is 1*0.55866+ 1*0.5=1.05866. The VisWt(i,j) for the candidate track pair that includes radar track 418 is $$\frac{.5}{1.05866} = .47230.$$

Likewise, for each radar track, the evidence of the candidate vision tracks is normalized according to:

$$Rdr\,\text{Wt}\,(i,\,j) = \frac{\text{Evidence}\,(i,\,j)}{\sum_{j=1}^{N_{vis}} FM(i,\,j) * \text{Evidence}\,(i,\,j)} \quad \text{Equation 2}$$

where,

RdrWt(i,j)=vision track weight at entry (i,j) of the evidence matrix,

Evidence (i,j)=the evidence value at entry (i,j) of the evidence matrix, and

FM(i,j)=

Entry in feasibility matrix (1 for feasible pair and 0 for non-feasible pair).

The RdrWt(i,j) for the radar track 418 can be calculated. The denominator of equation 2 for the radar track 418 is 1*0.5+1*0.24631=0.74631. The VisWt(i,j) for the candidate track pair that includes radar track 416 is $$\frac{.5}{.74631} = .66996.$$

Once the evidence is normalized for each vision track and each radar track, according to the techniques described above. The connection weight, ConnWt(i,j), for each candidate track pair can be calculated as follows:

ConnWt(i,j)=VisWt(i,j)+RdrWt(i,j)     Equation 3

Continuing with the example calculation for the candidate track pair including the vision track 404 and the radar track 418, ConnWt(404,418)=0.47230+0.66996=1.14226.

After the connection weight for each feasible candidate track pair is calculated, each entry in the connection weight matrix may be compared to a threshold weight value. A candidate track pair with an entry below a threshold value may be pruned. In this example, the candidate track pair including the vision track 406 and the radar track 422 falls below a threshold (e.g., a threshold weight of 0.25) and is pruned. Once that entry is pruned, the vision tracks 404 and 406 and the radar tracks 416, 418, and 420 do not correspond with any other tracks in the large cluster. Therefore, connection 436 is pruned and two smaller clusters are formed. In some aspects, the steps described above can be performed on the smaller clusters to form multiple clusters. In this manner, the smaller clusters of candidate track pairs may enable the computational complexity involved with pattern-matching to be reduced exponentially.

Example Method

FIG. 5 illustrates an example method for clustering track pairs for multi-sensor track association. The operations (or steps) 502 through 510 are performed but are not necessarily limited to the order or combinations in which the operations are shown herein. Further, any of one or more of the operations may be repeated, combined, or reorganized to provide other operations.

At step 502, candidate track pairs are determined. A sensor-fusion system receives tracks derived from sensor data (e.g., vision data, radar data). The cluster of tracks from the different types of sensors are paired as candidate track pairs. The candidate track pairs have a connection that represents an association between the two tracks in the candidate track pair to represent a same object. The connection of each candidate track pair is a probability that they associate with the same object.

At step 504, responsive to identifying a connection with a weakest strength associated with the candidate track pairs, a weakest track pair is pruned. Once a candidate track pair (or multiple candidate track pairs) with a weakest strength is identified, the candidate track pair may be deemed unfeasible. Feasibility is a measure of the probability that the two tracks in a candidate track pair represent the same object and may be determined by meeting some minimum requirement. For example, a vision track originating from a camera mounted at the front of a vehicle may not be feasible to match with a radar track originating from a radar mounted at the rear of the vehicle. In some aspects, the strength of the connection between the two tracks of a candidate track pair may be required to be below a threshold strength before it is considered for pruning.

At step 506, responsive to pruning the weakest candidate track pair, the remainder of the candidate track pairs are clustered into at least a first cluster and a second cluster. After the weakest candidate track pair has been pruned, if there is a subset of tracks in the original cluster of tracks that do not share feasible matches with tracks in another subset of tracks in the original cluster of tracks, the two subsets may be analyzed separately. That is, the original cluster may be split into smaller clusters, and the best patterns may still be generated without a significant loss of matching information.

At step 508, a set of object track pairs from the at least first cluster and the second cluster is determined. The set of object track pairs are defined by a high probability (often based on the probability being above a threshold) that the tracks in the object track pair associate with the same object. They are determined by analyzing the clusters using various techniques, including track-association techniques such as JPDA or MHT. Often, these techniques are computationally complex. By splitting a large cluster into smaller clusters, the computational complexity may be reduced, resulting in more efficient analysis and a quicker determination of the set of object track pairs. The set of object track pairs is maintained and may constantly be updated as new sensor data is received.

At step 510, the set of object track pairs is outputted to an automotive system of a vehicle. Some non-limiting examples of automotive systems that may utilize the set of object track pairs are autonomous control systems, safety systems, driver interface systems, or other systems. For example, an autonomous control system may utilize the set of object track pairs to avoid objects represented by the set of object track pairs as the vehicle navigates a road. The techniques for clustering track pairs for multi-sensor track association as described herein may provide the automotive systems with object data more efficiently and enable the automotive systems to make quicker driving decisions resulting in increased safety.

Additional Examples

Example 1: A system comprising: at least one processor configured to: determine candidate track pairs, each candidate track pair representing a connection between a first track obtained by a first sensor and a second track obtained by a second sensor, the connection based on an association between the first track and the second track to represent a same object; responsive to identifying a connection with a weakest strength associated with the candidate track pairs, prune a weakest candidate track pair, the weakest candidate track pair having the connection with the weakest strength; responsive to pruning the weakest candidate track pair, cluster the candidate track pairs into at least a first cluster of the candidate track pairs and a second cluster of the candidate track pairs; determine, based on track-association techniques, a set of object track pairs from the at least first cluster of the candidate track pairs and the second cluster of the candidate track pairs, a first track and a second track of each respective object track pair in the set of object track pairs representing the same object; and output the set of object track pairs to an automotive system of a vehicle to control operations of the vehicle.

Example 2: The system of example 1, wherein the at least one processor is configured to identify the connection with the weakest strength associated with the candidate track pairs by at least: determining, a feasibility of each candidate track pair based on the likelihood that the first track and the second track of the respective candidate track pair represents the same object; determining, based on the feasibility of the connection represented by each feasible candidate track pair, a cost and evidence of the connection associated with each feasible candidate track pair; responsive to determining the evidence of the connection associated with each feasible candidate track pair: comparing, to one another, the evidence of the connections associated with each candidate track pair having the same first track; and comparing, to one another, evidence of the connections associated with each candidate track pair having the same second track; and responsive to comparing the evidence of the connections associated with each candidate track pair having the same first track and comparing evidence of the connections associated with each candidate track pair having the same second track, identifying the weakest candidate track pair.

Example 3: The system of example 2, wherein the at least one processor is configured to compare the evidence of the connections associated with each candidate track pair having the same first track and compare evidence of the connections associated with each candidate track pair having the same second track by at least: normalizing evidence of the connection of each first track with the second tracks that are feasible with the respective first track, and normalizing evidence of the connection of each second track with the first tracks that are feasible with the respective second track.

Example 4: The system of example 3, wherein the at least one processor is further configured to: combine, for each respective candidate track pair, the normalized evidence based on the connection of each first track with the second tracks that are feasible with the respective first track and the normalized evidence based on of the connection of each second track with the first tracks that are feasible with the respective second track.

Example 5: The system of example 4, wherein the connection of the weakest candidate track pair is identified based on the combined normalized evidence associated with each candidate track pair.

Example 6: The system of example 5, wherein the at least one processor is further configured to prune the weakest candidate track pair by at least: pruning any candidate track pair with a connection having a combined normalized evidence(connection strength) below a threshold.

Example 7: The system of example 5 or 6, wherein the at least one processor is further configured to: maintain a feasibility matrix including feasibility data for each candidate track pair.

Example 8: The system of example 7, wherein the at least one processor is further configured to: maintain a cost matrix including cost data for each candidate track pair that is feasible, the cost data based on comparing data obtained by the first sensor to data obtained by the second sensor to determine a measure of association between the first track and the second track of the candidate track pair.

Example 9: The system of example 8, wherein the at least one processor is further configured to: maintain an evidence matrix including evidence data determined by inverting the cost data.

Example 10: The system of example 9, wherein the at least one processor is further configured to: maintain a connection weight matrix including the combined normalized evidence associated with each candidate pair.

Example 11: The system of any one of the previous examples, wherein the strength of the connection associated with the candidate track pair is determined from a perspective of the tracks obtained by the first sensor compared to a perspective of the tracks obtained by the second sensor.

Example 12: The system of any one of the previous examples, wherein a quantity of candidate track pairs is greater than a threshold quantity, and wherein clustering the candidate track pairs into the first cluster of the candidate track pairs and the second cluster of the candidate track pairs results in maintaining a fixed maximum level of computational complexity.

Example 13: The system of any one of the previous examples, wherein the track-association techniques comprise at least one of a joint probabilistic association filter (IPDA) or multiple hypothesis tracking (WIT).

Example 14: The system of any one of the previous examples, wherein the first sensor and the second sensor comprise one of: a camera; a radar sensor; or a LiDAR sensor, and wherein the second sensor is a different type of sensor than the first sensor.

Example 15: A computer-readable storage medium comprising instructions that, when executed, configure at least one processor to: determine candidate track pairs, each candidate track pair representing a connection between a first track obtained by a first sensor and a second track obtained by a second sensor, the connection based on an association between the first track and the second track to represent a same object; responsive to identifying a connection with a weakest strength associated with the candidate track pairs, prune a weakest candidate track pair, the weakest candidate track pair having the connection with the weakest strength; responsive to pruning the weakest candidate track pair, cluster the candidate track pairs into at least a first cluster of the candidate track pairs and a second cluster of the candidate track pairs; determine, based on track-association techniques, a set of object track pairs from the at least first cluster of the candidate track pairs and the second cluster of the candidate track pairs, a first track and a second track of each respective object track pair in the set of object track pairs representing the same object; and output the set of object track pairs to an automotive system of a vehicle to control operations of the vehicle.

Example 16: The computer-readable storage medium of example 15, wherein the instructions, when executed, configure the at least one processor to identify the connection with the weakest strength associated with the candidate track pairs by at least: determining, based on the feasibility of the connection represented by each candidate track pair, a cost and an evidence of the connection associated with each feasible candidate track pair; responsive to determining the evidence of the connection associated with each candidate track pair that is feasible: normalizing evidence of the connection of each first track with the second tracks that are feasible with the respective first track; and normalizing evidence of the connection of each second track with the first tracks that are feasible with the respective second track; and combining, for each respective candidate track pair, the normalized evidence based on the connection of each first track with the second tracks that are feasible with the respective first track and the normalized evidence based on the connection of each second track with the first tracks that are feasible with the respective second track to produce a connection weight for each candidate track pair; and responsive to combining, for each respective candidate track pair, the normalized evidence, identifying the weakest candidate track pair by selecting the candidate track pair with a least combined normalized evidence.

Example 17: The computer-readable storage medium of example 15 or 16, wherein a quantity of candidate track pairs is greater than a threshold quantity, and wherein clustering the candidate track pairs into the first cluster of the candidate track pairs and the second cluster of the candidate track pairs results in maintaining a fixed maximum level of computational complexity.

Example 18: A method comprising: determining candidate track pairs, each candidate track pair representing a connection between a first track obtained by a first sensor and a second track obtained by a second sensor, the connection based on an association between the first track and the second track to represent a same object; responsive to identifying a connection with a weakest strength associated with the candidate track pairs, pruning a weakest candidate track pair, the weakest candidate track pair having the connection with the weakest strength; responsive to pruning the weakest candidate track pair, clustering the candidate track pairs into at least a first cluster of the candidate track pairs and a second cluster of the candidate track pairs; determining, based on track-association techniques, a set of object track pairs from the at least first cluster of the candidate track pairs and the second cluster of the candidate track pairs, a first track and a second track of each respective object track pair in the set of object track pairs representing the same object; and outputting the set of object track pairs to an automotive system of a vehicle to control operations of the vehicle.

Example 19: The method of example 18, wherein pruning the weakest candidate track pair further comprises: pruning each candidate track having a strength below a threshold strength.

Example 20: The method of example 18 or 19, a quantity of candidate track pairs is greater than a threshold quantity, and wherein clustering the candidate track pairs into the first cluster of the candidate track pairs and the second cluster of the candidate track pairs results in maintaining a fixed maximum level of computational complexity.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with the computational complexity of pattern-matching algorithms can occur in other systems. Therefore, although described as a way to reduce computational complexity in automotive applications, the techniques of the foregoing description can be applied to other systems that include track-association techniques.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system comprising:
    at least one processor configured to:
        determine candidate track pairs from among a cluster of tracks, each candidate track pair representing a connection between a first track obtained by a first sensor and a second track obtained by a second sensor, the connection based on an association between the first track and the second track to represent a same object;
        determine, from a perspective of the first tracks obtained by the first sensor as compared to a perspective of the second tracks obtained by the second sensor, a strength of the connection associated with each of the candidate track pairs;
        identify a weakest candidate track pair among the candidate track pairs based on the strength of the connection associated with each of the candidate track pairs, the strength of connection between the weakest candidate track pair being a weakest strength among the candidate track pairs;
        prune the weakest candidate track pair;
        responsive to pruning the weakest candidate track pair, cluster the candidate track pairs into at least a first cluster of the candidate track pairs and a second cluster of the candidate track pairs such that the first cluster of the candidate track pairs and the second cluster of the candidate track pairs are each smaller than the cluster of tracks;
        determine, based on track-association techniques, a set of object track pairs from the at least the first cluster of the candidate track pairs and the second cluster of the candidate track pairs, a first track and a second track of each respective object track pair in the set of object track pairs representing the same object; and
        output the set of object track pairs to an automotive system of a vehicle to control operations of the vehicle.

2. The system of claim 1, wherein the at least one processor is configured to identify the weakest candidate track pair by at least:
    determining, a feasibility of each candidate track pair based on a likelihood that the first track and the second track of the respective candidate track pair represents the same object;
    determining, based on the feasibility of the connection represented by each feasible candidate track pair, an evidence of the connection associated with each feasible candidate track pair;

responsive to determining the evidence of the connection associated with each feasible candidate track pair:
comparing, to one another, the evidence of the connections associated with each candidate track pair having the same first track; and
comparing, to one another, the evidence of the connections associated with each candidate track pair having the same second track; and
responsive to comparing the evidence of the connections associated with each candidate track pair having the same first track and comparing the evidence of the connections associated with each candidate track pair having the same second track, identifying the weakest candidate track pair.

3. The system of claim 2, wherein the at least one processor is configured to compare the evidence of the connections associated with each candidate track pair having the same first track and compare the evidence of the connections associated with each candidate track pair having the same second track by at least:
normalizing the evidence of the connection of each first track with the second tracks that are feasible with the respective first track, and
normalizing the evidence of the connection of each second track with the first tracks that are feasible with the respective second track.

4. The system of claim 3, wherein the at least one processor is further configured to:
combine, for each respective candidate track pair, the normalized evidence based on the connection of each first track with the second tracks that are feasible with the respective first track and the normalized evidence based on of the connection of each second track with the first tracks that are feasible with the respective second track.

5. The system of claim 4, wherein the connection of the weakest candidate track pair is identified based on the combined normalized evidence associated with each candidate track pair.

6. The system of claim 5, wherein the at least one processor is further configured to prune the weakest candidate track pair by at least:
pruning any candidate track pair with a connection having a combined normalized evidence below a threshold.

7. The system of claim 5, wherein the at least one processor is further configured to:
maintain a feasibility matrix including feasibility data for each candidate track pair.

8. The system of claim 7, wherein the at least one processor is further configured to:
maintain a cost matrix including cost data for each candidate track pair that is feasible, the cost data based on comparing data obtained by the first sensor to data obtained by the second sensor to determine a measure of association between the first track and the second track of the candidate track pair.

9. The system of claim 8, wherein the at least one processor is further configured to:
maintain an evidence matrix including evidence data determined by inverting the cost data.

10. The system of claim 9, wherein the at least one processor is further configured to:
maintain a connection weight matrix including the combined normalized evidence associated with each candidate pair.

11. The system of claim 1, wherein a quantity of candidate track pairs is greater than a threshold quantity, and wherein clustering the candidate track pairs into the first cluster of the candidate track pairs and the second cluster of the candidate track pairs results in maintaining a fixed maximum level of computational complexity.

12. The system of claim 1, wherein the track-association techniques comprise at least one of a joint probabilistic association filter (JPDA) or multiple hypothesis tracking (MHT).

13. The system of claim 1, wherein the first sensor and the second sensor comprise one of:
a camera;
a radar sensor; or
a LiDAR sensor, and
wherein the second sensor is a different type of sensor than the first sensor.

14. A non-transitory computer-readable storage medium comprising instructions that, when executed, cause at least one processor to:
determine candidate track pairs from among a cluster of tracks, each candidate track pair representing a connection between a first track obtained by a first sensor and a second track obtained by a second sensor, the connection based on an association between the first track and the second track to represent a same object;
determine, from a perspective of the first tracks obtained by the first sensor as compared to a perspective of the second tracks obtained by the second sensor, a strength of the connection associated with each of the candidate track pairs;
identify a weakest candidate track pair among the candidate track pairs based on the strength of the connection associated with each of the candidate track pairs, the strength of connection between the weakest candidate track pair being a weakest strength among the candidate track pairs;
prune the weakest candidate track pair;
responsive to pruning the weakest candidate track pair, cluster the candidate track pairs into at least a first cluster of the candidate track pairs and a second cluster of the candidate track pairs such that the first cluster of the candidate track pairs and the second cluster of the candidate track pairs are each smaller than the cluster of tracks;
determine, based on track-association techniques, a set of object track pairs from the at least the first cluster of the candidate track pairs and the second cluster of the candidate track pairs, a first track and a second track of each respective object track pair in the set of object track pairs representing the same object; and
output the set of object track pairs to an automotive system of a vehicle to control operations of the vehicle.

15. The non-transitory computer-readable storage medium of claim 14, wherein the instructions, when executed, cause the at least one processor to identify the weakest candidate track pair by at least:
determining, based on the connection represented by each candidate track pair, a feasibility of each candidate track pair;
determining, based on the feasibility of the connection represented by each candidate track pair, a cost and an evidence of the connection associated with each feasible candidate track pair;
responsive to determining the evidence of the connection associated with each candidate track pair that is feasible:

normalizing evidence of the connection of each first track with the second tracks that are feasible with the respective first track; and normalizing evidence of the connection of each second track with the first tracks that are feasible with the respective second track; and combining, for each respective candidate track pair, the normalized evidence based on the connection of each first track with the second tracks that are feasible with the respective first track and the normalized evidence based on the connection of each second track with the first tracks that are feasible with the respective second track to produce a connection weight for each candidate track pair; and responsive to combining, for each respective candidate track pair, the normalized evidence, identifying the weakest candidate track pair by selecting the candidate track pair with a least combined normalized evidence.

16. The non-transitory computer-readable storage medium of claim 14, wherein a quantity of candidate track pairs is greater than a threshold quantity, and wherein clustering the candidate track pairs into the first cluster of the candidate track pairs and the second cluster of the candidate track pairs results in maintaining a fixed maximum level of computational complexity.

17. A method comprising:

determining candidate track pairs from among a cluster of tracks, each candidate track pair representing a connection between a first track obtained by a first sensor and a second track obtained by a second sensor, the connection based on an association between the first track and the second track to represent a same object;

determining, from a perspective of the first tracks obtained by the first sensor as compared to a perspective of the second tracks obtained by the second sensor, a strength of the connection associated with each of the candidate track pairs;

identifying a weakest candidate track pair among the candidate track pairs based on the strength of the connection associated with each of the candidate track pairs, the strength of connection between the weakest candidate track pair being a weakest strength among the candidate track pairs;

pruning the weakest candidate track pair;

responsive to pruning the weakest candidate track pair, clustering the candidate track pairs into at least a first cluster of the candidate track pairs and a second cluster of the candidate track pairs such that the first cluster of the candidate track pairs and the second cluster of the candidate track pairs are each smaller than the cluster of tracks;

determining, based on track-association techniques, a set of object track pairs from the at least the first cluster of the candidate track pairs and the second cluster of the candidate track pairs, a first track and a second track of each respective object track pair in the set of object track pairs representing the same object; and outputting the set of object track pairs to an automotive system of a vehicle to control operations of the vehicle.

18. The method of claim 17, wherein pruning the weakest candidate track pair further comprises:

pruning each candidate track having a strength below a threshold strength.

19. The method of claim 17, wherein a quantity of candidate track pairs is greater than a threshold quantity, and wherein clustering the candidate track pairs into the first cluster of the candidate track pairs and the second cluster of the candidate track pairs results in maintaining a fixed maximum level of computational complexity.

20. The method of claim 17, wherein the identifying the weakest candidate track pair comprises:

determining, a feasibility of each candidate track pair based on a likelihood that the first track and the second track of the respective candidate track pair represents the same object;

determining, based on the feasibility of the connection represented by each feasible candidate track pair, an evidence of the connection associated with each feasible candidate track pair;

responsive to determining the evidence of the connection associated with each feasible candidate track pair:

comparing, to one another, the evidence of the connections associated with each candidate track pair having the same first track; and comparing, to one another, the evidence of the connections associated with each candidate track pair having the same second track; and responsive to comparing the evidence of the connections associated with each candidate track pair having the same first track and comparing the evidence of the connections associated with each candidate track pair having the same second track, identifying the weakest candidate track pair.

* * * * *